United States Patent [19]

Narukami

[11] Patent Number: 5,475,465
[45] Date of Patent: Dec. 12, 1995

[54] METHOD FOR CHANGING GUIDE WIDTH AND MECHANISM USED THEREFOR

[75] Inventor: Shinji Narukami, Wakayama, Japan

[73] Assignee: Noritsu Koki Co., Ltd., Wakayama, Japan

[21] Appl. No.: 330,863

[22] Filed: Oct. 28, 1994

[30] Foreign Application Priority Data

Nov. 10, 1993 [JP] Japan .................................. 5-281350

[51] Int. Cl.⁶ ................................................. G03D 13/08
[52] U.S. Cl. ................................................. 354/339
[58] Field of Search .......................... 354/339, 319–321; 226/15, 19, 21, 177; 355/72–74; 242/344, 34 C, 332, 326.4

[56] References Cited

U.S. PATENT DOCUMENTS

| | | | |
|---|---|---|---|
| 3,834,642 | 9/1974 | St. Sauveur et al. | 226/177 X |
| 4,243,314 | 1/1981 | Bowe et al. | 355/29 |
| 4,880,104 | 11/1989 | Evans et al. | 198/445 |
| 5,333,770 | 8/1994 | Kano et al. | 226/15 |

FOREIGN PATENT DOCUMENTS

| | | |
|---|---|---|
| 3538048 | 10/1985 | Germany . |
| 57-004843 | 1/1982 | Japan . |
| 57-148203 | 9/1982 | Japan . |
| 2236387 | 9/1989 | United Kingdom . |

*Primary Examiner*—D. Rutledge
*Attorney, Agent, or Firm*—Armstrong, Westerman, Hattori, McLeland & Naughton

[57] ABSTRACT

A mechanism for changing a guide width is provided to automatically change a width of a width guide depending upon papers differ from each other in true width in spite of the same nominal size. The mechanism comprises a width guide, a pulse motor for moving the width guide in a width direction of the paper, a detecting board with detecting holes attached to a guide member of the width guide and a position sensor detecting a standard position of the detecting holes, and is provided to move the guide member only a distance of indicated pulses from the standard position.

2 Claims, 5 Drawing Sheets

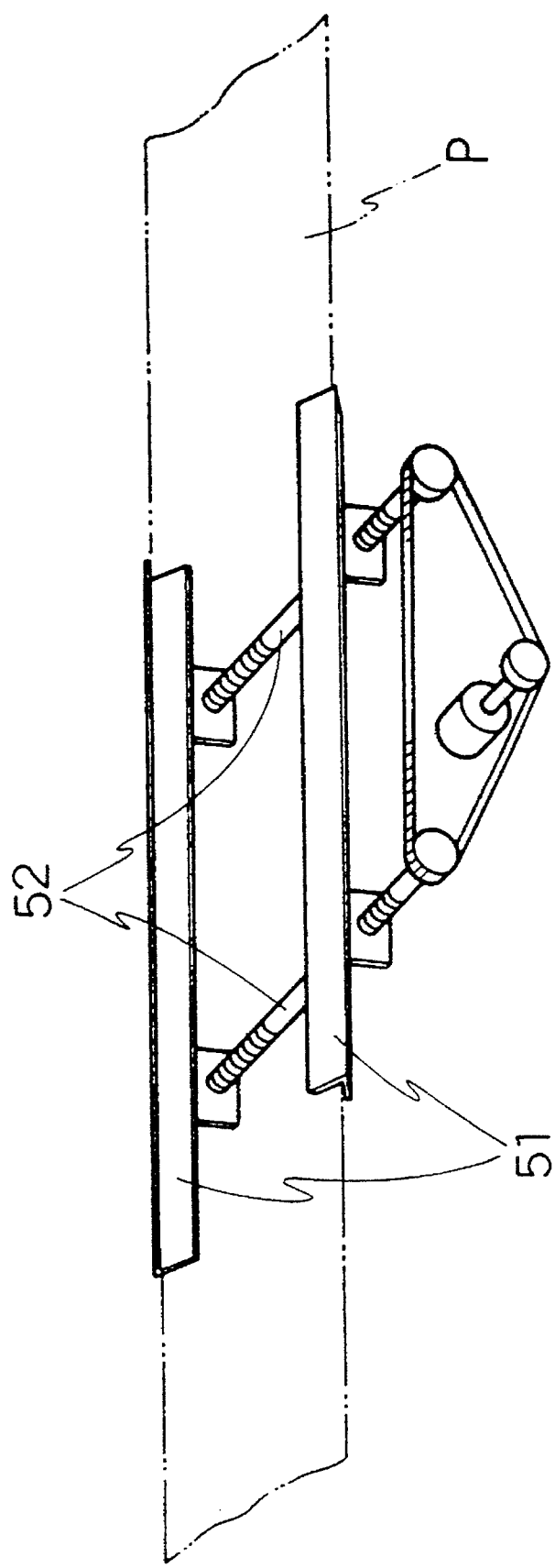

METHOD FOR CHANGING GUIDE WIDTH AND MECHANISM USED THEREFOR

BACKGROUND OF THE INVENTION

The present invention relates to a method for changing a guide width and a mechanism for changing a guide width and, more particularly, to a method and a mechanism for changing a guide width of a width guide so that a photosensitive material can be guided properly with respect to width direction thereof in a conveyance course of photosensitive materials in a photo-processing apparatus.

The conventional width guide, as shown in FIG. 6 for example, comprises a pair of V-shaped members 51 guiding both side edges of a photosensitive material P and a screw shaft 52. A distance between the members 51 is adjusted by turning the screw shaft 52 to move both or one of V-shaped members. It is also known to use a rack and pinion (not illustrated) for moving the V-shaped members.

Width of the width guide is fitted to a width of a photosensitive material to be treated by turning the screw shaft of the width guide or the pinion with a operator's hand, or a motor and the like.

In the concrete, a width of a width guide is adjusted by inserting a photosensitive material to be treated into a first width guide, looking at a clearance between the width guide and an edge of a photosensitive material and moving the width guide by a manual or electromotive operation.

It takes, however, a long time and requires complicated operations to adjust each width guide one by one according to a photosensitive material every time a photosensitive material is changed, since many width guides are provided in a photo-processing apparatus along a conveyance course of photosensitive material.

Thus, there has been employed a method as a simple method wherein a width of a width guide for every nominal size of a photosensitive material (e.g. 89 mm, 127 mm) is predetermined and the width guide is automatically moved to a directed position by directing a nominal size of a photosensitive material to be treated.

Recently, in addition to increase in numbers of size of photosensitive materials, there are some differences in true widths thereof depending upon manufacturers even if they are of the same nominal size.

Therefore, according to the above conventional method, since a width of a width guide corresponds to a nominal size only one to one, a photosensitive material cannot be conveyed because of deviation from the width guide when the real width of the photosensitive material is narrower than a predetermined guide width, while the photosensitive material cannot be conveyed because of catching by the width guide when the real width of the photosensitive material is wider than a predetermined guide width.

In that case, since a guide board adapted to a width of a photosensitive material to be treated must be prepared and exchanged one by one, operating cost of the apparatus rises sharply.

It is an object of the present invention to solve the above problems and to provide a method and a mechanism for automatically changing a width of a width guide depending upon photosensitive materials which differ from each other in true width even though they have the same nominal size.

SUMMARY OF THE INVENTION

In accordance with the present invention, there is provided a method for changing a guide width (hereinafter referred to as "guide width change method") depending upon a width of a photosensitive material in a photo-processing apparatus, comprising: determining a plurality kinds of standard guide widths corresponding one by one to each of a plurality kinds of nominal sizes of photosensitive materials, and correcting the guide width in a direction of extension and/or reduction relating to each standard guide width depending upon a true width of the photosensitive material.

On the other hand, in accordance with the present invention, there is also provided a mechanism for changing a guide width (hereinafter referred to as "guide width change mechanism") depending upon a width of a photosensitive material in a photo-processing apparatus, comprising: a driving means for moving a width guide in a width direction of a photosensitive material; a detecting means for detecting a position of the width guide; and an indication means for indicating to the driving means a standard position of the width guide corresponding one by one to a nominal size of the photosensitive material, depending upon the nominal size of the photosensitive material, and for further indicating to the driving means a necessary removal distance from the standard position depending upon a true width of the photosensitive material.

According to the guide width change method of the present invention, even if a next photosensitive material to be treated is of the same nominal size of the previous one but true widths of the both are different from each other, a widths guide can be changed to a correct width by directing the width of a next photosensitive material to be treated (e.g. directing a nominal size and a symbol of a maker's name).

In addition, according to the guide width change mechanism of the present invention, by directing a width of a photosensitive material to be treated, driving means of a width guide receives an indication of a standard position corresponding to the nominal size and of a necessary removal distance from the standard position, and moves a width guide to a correct position.

BRIEF DESCRIPTION OF THE DRAWINGS

FIG. 6 is a perspective view showing an example of a conventional width guide.

DETAILED DESCRIPTION

A guide width change mechanism according to the present invention will now be described in detail with reference to the drawings.

Figure 1:
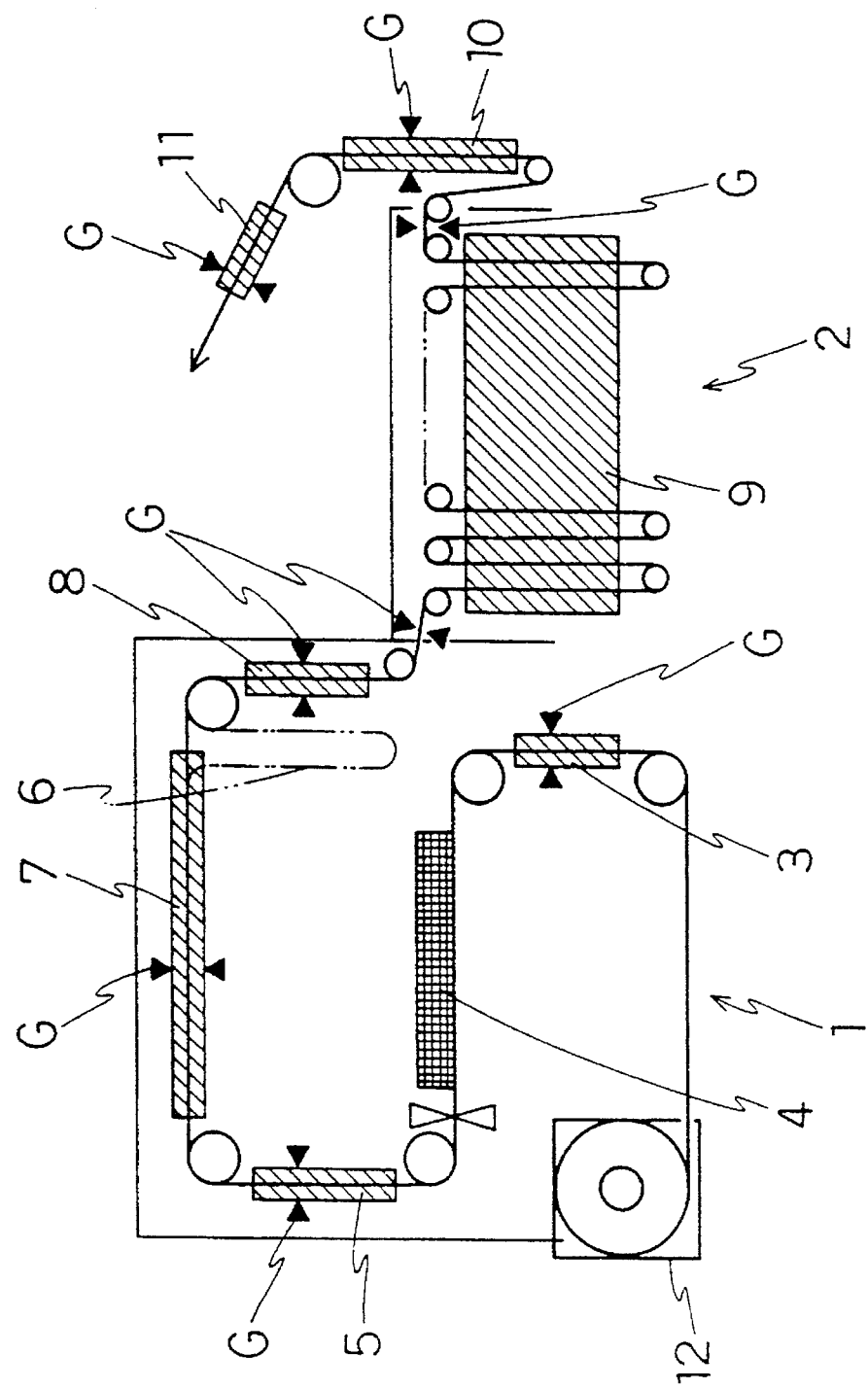
FIG. 1 is a schematic representation of a photo-processing apparatus to which a guide width change mechanism of the present invention is applied.

Referring to FIG. 1, a photo-processing apparatus comprises a printing part 1 for subjecting a photosensitive material (hereinafter referred to as "paper") to an exposure and a processing part 2 for treatment of developing the exposed paper and so on.

The printing part 1 includes along a conveyance course of a paper a loading part 3 to convey the paper to an exposing table, an advancing part 5 to convey the paper precisely in a constant length, a paper conveying part 7 capable of forming a loop 6 for adjusting a progress of the paper to be conveyed to the processing part 2 and an outlet part 8.

The processing part 2 includes a processor rack part 9 in a processing tank for color development, bleach and fixing stabilization, a drier part 10 in a drying chamber for drying a paper and a cutter part 11 adjacent an outlet 11 respectively.

Width guides G to guide both side edges of a paper are generally disposed to each blocks 3, 4, 5, 7, 8, 9, 10, 11. Numeral 12 is a rack for a paper magazine.

Figure 2:
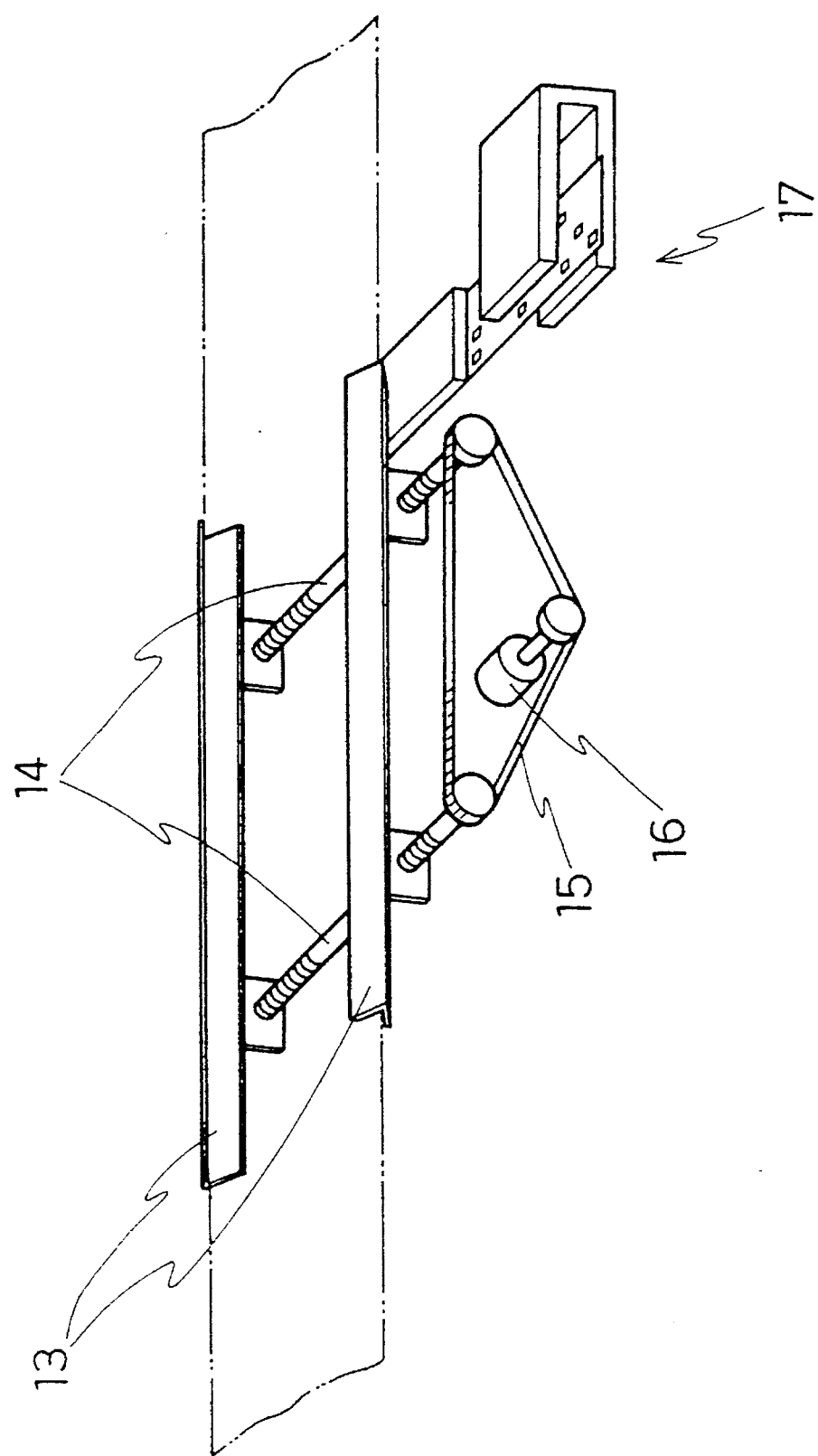
FIG. 2 is a perspective view showing an embodiment of a guide width change mechanism of the present invention.

Referring to FIG. 2, the width guide G comprises a pair of guide members 13, a screw shaft 14 connecting the guide members and a pulse motor 16 rotating the screw shaft 14 through a belt 15 to enlarge or reduce a distance between the guide members 13.

The width guide G is provided with a guide position detecting part (hereinafter referred to as "detecting part") 17. The detecting part 17 comprises a detecting board 18 fixed to the guide member 13 and a position sensor 219 for detecting marks on the detecting board 18.

Figure 3:
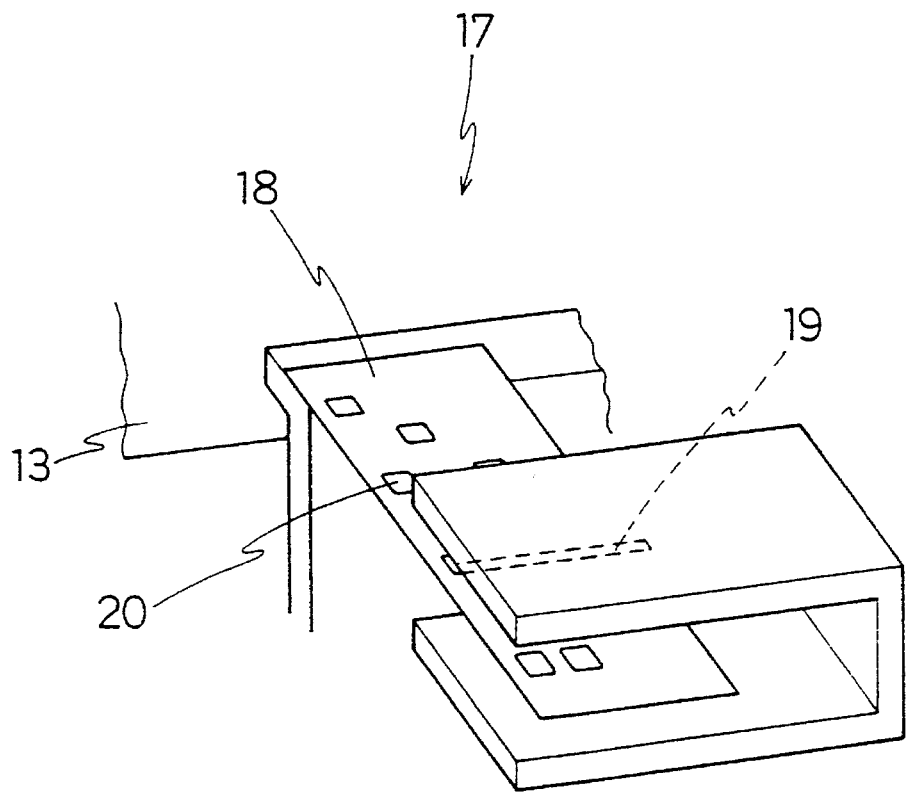
FIG. 3 is an enlarged perspective view of a principal part of FIG. 2.
Figure 4:
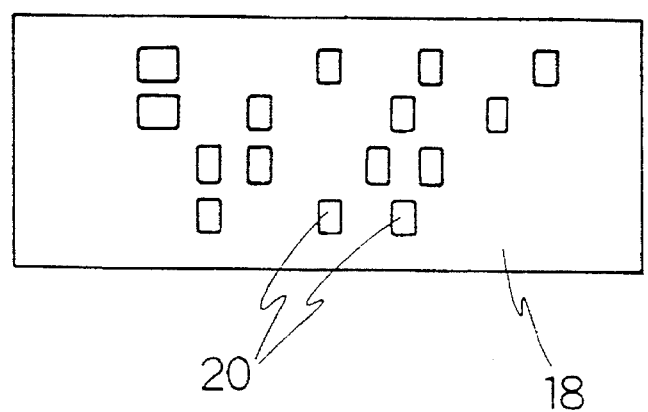
FIG. 4 is a plan view showing an example of a detection board in FIG. 2.

As shown in FIG. 3, the detecting board 18 is provided with the corresponding marks i.e. detecting holes 20 for every nominal size. A photo interrupter, phototransistor or the like can also be used as a position sensor 19. The position sensor 19 receives an indication which is given by setting a paper magazine to a magazine rack 12 in a photo-processing apparatus or inputting a nominal size of a paper directly into a central processing unit in a photo-processing apparatus through a keyboard, and then the pulse motor 16 moves a guide member 13 until the position sensor 19 detects a detecting hole 20 on a detecting board 18 corresponding to a relevant nominal size. When a detecting hole 20 to be aimed is detected, the pulse motor for moving the guide member 13 stops rotating to force the guide member 13 to halt at a position forming a predetermined width.

In addition to the above-mentioned function, the present embodiment also fulfills the following functions. That is, more than two kinds of guide positions of a width guide G corresponding to the same nominal size can be set as shown in FIG. 5.

Figure 5A:
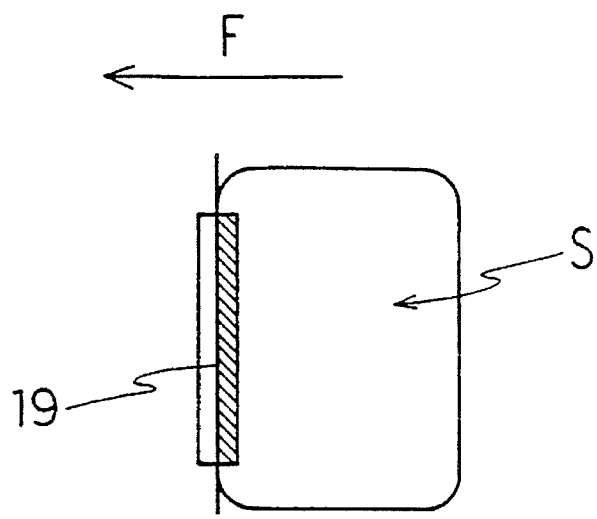
FIGS. 5a to 5d are schematic representations showing movement of a guide width change mechanism of FIG. 2.
Figure 5B:
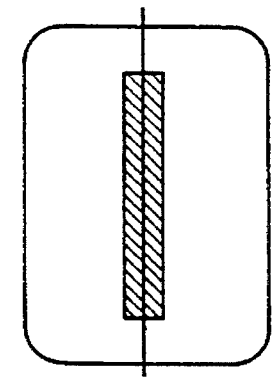
Figure 5C:
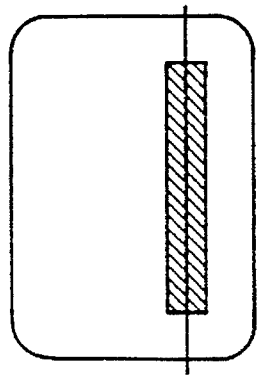
Figure 5D:
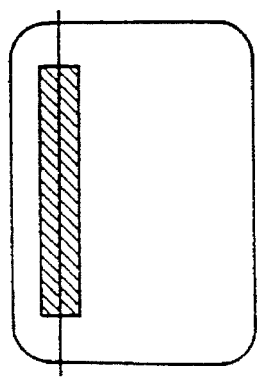

Firstly, supposing that a particular nominal size of a paper is S, since the widths of papers slightly differ from each other among makers even for the same S, these widths are set to, for example, three kinds of widths N, A and B. Secondly, the first starting position of a detecting hole S on a detecting board is determined to a standard position of a guide member for an input nominal size S (FIG. 5a). An arrow F in the figure shows a direction of guide member to enlarge a guide width.

Thirdly, a guide position for a paper with a width of N (hereinafter referred to as "N paper") is set to, for example, S+10 (FIG. 5b) and is stored in a memory in the photo-processing apparatus. In the present specification, +10 pulses means a pulse number of a pulse motor in the direction to enlarge a width. A guide position for N paper is determined by measuring a guide width of a guide member at a standard position when a detecting part detects a detecting hole and then converting a difference from a necessary guide width of N paper to a pulse number of the pulse motor to correct the guide position. Alternatively it is determined by, in a first step, setting a temporal correct pulse number from a standard position and then moving a width guide to the temporary position, and in a second step measuring a guide width when the width guide is at the temporary position and then correcting again the temporary correct pulse number by a difference from a necessary guide width of N paper. In the above second step, correction of the position might be carried out by passing N paper between the guide members.

The guide position of N paper determined as aforesaid is set fixedly, and in the same manner as stated above guide positions for A paper and B paper are settled respectively of N+4 pulses (FIG. 5c) and N−3 pulses (FIG. 5d) for example.

Accordingly, when a paper magazine is set to a magazine rack, or a pair of S and N, S and A or S and B is appointed by an operator's input, the guide member moves to the standard position and then slows down to move only a distance of +10 pulses, +14 pulses or +7 pulses thereby reaching a proper guide position.

Further, the guide position for a pair of S and N, S and A or S and B having been memorized once is also traced by the width guide with reproducibility for a paper which would be set again.

In the above embodiment, though a standard position (FIG. 5a) is settled apart from that of each paper (N, A, B), a guide position of some paper (for example N) might be set as a standard position, and then a removal distance from the standard position to A might be settled of +4 pulses and that to B might be settled of −3 pulses. The kinds of widths in the same nominal size are not necessarily limited to the above 3 kinds (N, A, B), and therefore might be 2 or more than 3.

As for nominal sizes exept S, a plurality of kinds of widths can be settled in the same manner as mentioned above.

In FIG. 5, though a standard position of a width guide is set to the left edge of a detecting hole in the figure, every position in a detecting hole can be adopted as a standard position. It is, however, preferable to adopt an edge because of simplicity of setting.

The guide width change method and the guide width change mechanism of the present invention can change a guide width thereof so as to properly guide not only papers of different nominal size but also papers which differ from each other in true width in spite of the same nominal size, and therefore can optionally set a plurality kinds of guide positions for papers of the same nominal size.

While only certain presently preferred embodiments have been described in detail, as will be apparent with those familiar with the art, certian changes and modifications can be made without departing from the spirit and scope of the invention as defined by the following claims.

What is claimed is:

1. A method for changing a guide width depending upon a width of a photosensitive material in a photo-processing apparatus, comprising:

determining a plurality of kinds of standard guide widths corresponding one by one to each of a plurality kinds of nominal sizes of photosensitive materials, and correcting the guide width in a direction of extension and/or reduction relating to each standard guide width depending upon a true width of the photosensitive material.

2. A mechanism for changing a guide width depending upon a width of a photosensitive material in a photoprocessing apparatus, comprising:

a driving means for moving a width guide in a width direction of a photosensitive material; a detecting means for detecting a position of the width guide; and an indication means for indicating to the driving means a standard position of the width guide corresponding one by one to a nominal size of the photosensitive material, depending upon the nominal size of the photosensitive material, and for further indicating to the driving means a necessary removal distance from the standard position depending upon a true width.

\* \* \* \* \*